United States Patent [19]

Bronstad

[11] Patent Number: 4,655,434
[45] Date of Patent: Apr. 7, 1987

[54] ENERGY ABSORBING GUARDRAIL TERMINAL

[75] Inventor: Maurice E. Bronstad, San Antonio, Tex.

[73] Assignee: Southwest Research Institute, San Antonio, Tex.

[21] Appl. No.: 855,853

[22] Filed: Apr. 24, 1986

[51] Int. Cl.⁴ .............................................. A01K 3/00
[52] U.S. Cl. ......................................... 256/13.1; 403/2
[58] Field of Search ................... 256/13.1, 19; 403/2; 248/66

[56] References Cited

U.S. PATENT DOCUMENTS

| | | | |
|---|---|---|---|
| 2,438,991 | 4/1948 | Camp | 256/13.1 |
| 2,974,934 | 3/1961 | White | 256/13.1 |
| 3,717,326 | 2/1973 | Leach et al. | 256/13.1 |
| 3,856,268 | 12/1974 | Fitch | 256/13.1 |
| 3,880,404 | 4/1975 | Fitch | 256/13.1 X |
| 3,972,107 | 8/1976 | Deike | 29/401 R |
| 3,982,734 | 9/1976 | Walker | 256/13.1 |
| 4,062,521 | 12/1977 | Moreau | 256/13.1 X |
| 4,124,197 | 11/1978 | God Jr. | 256/13.1 |
| 4,330,106 | 5/1982 | Chisholm | 256/13.1 |
| 4,452,431 | 6/1984 | Stephens et al. | 256/13.1 |

Primary Examiner—Richard J. Scanlan, Jr.
Attorney, Agent, or Firm—Fulbright & Jaworski

[57] ABSTRACT

An energy absorbing guardrail terminal having a plurality of horizontally extending parallel guardrails on opposite sides of breakaway posts in which the guardrails have overlapping ends and the upstream ends are secured to the posts. Splice bolts connect the overlapping ends of adjacent rails and a plurality of spaced openings are provided in each rail horizontally aligned with each of the splice bolts whereby the impact of a vehicle on the upstream end of the rails will shred out the rail material between the spaced openings to absorb the kinetic energy of the impacting vehicle. Preferably the openings are slots elongated in the horizontal direction and the rails are staged to allow the upstream rails to telescope over the downstream rails.

7 Claims, 15 Drawing Figures

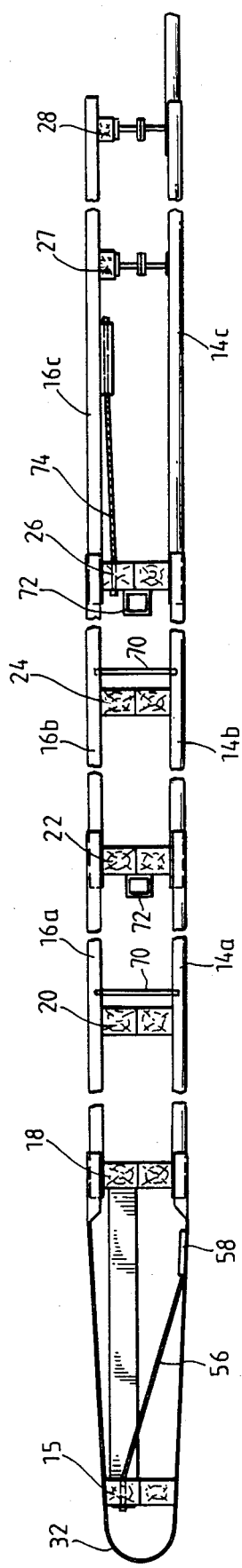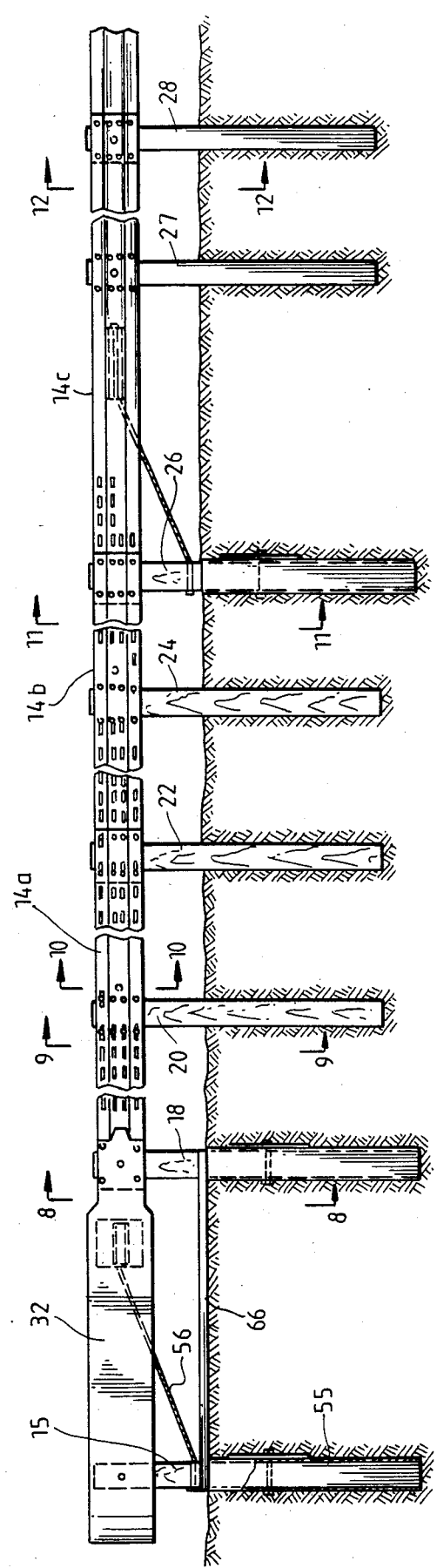

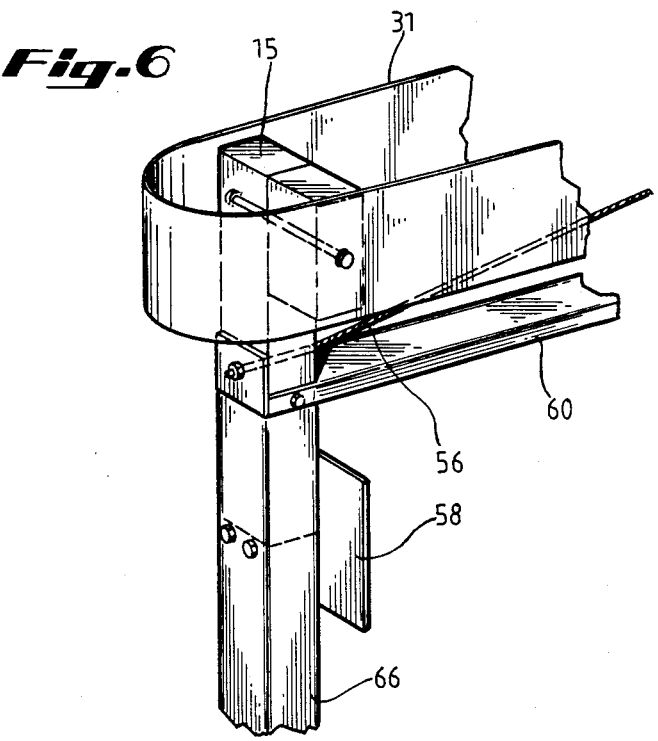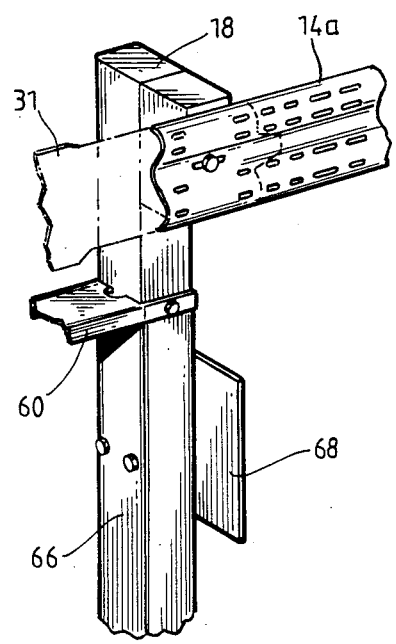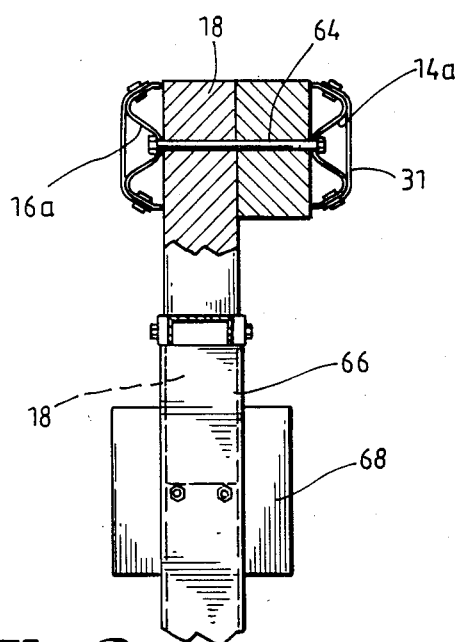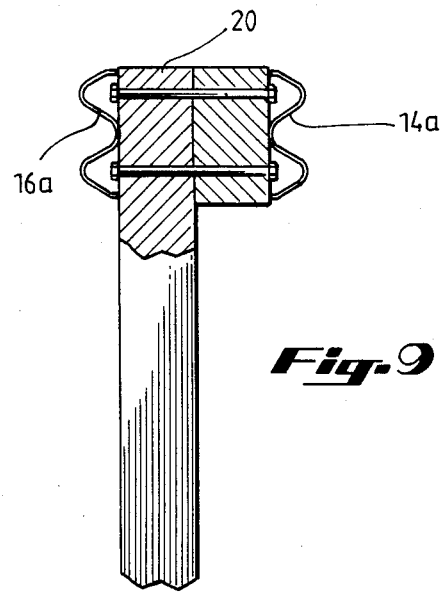

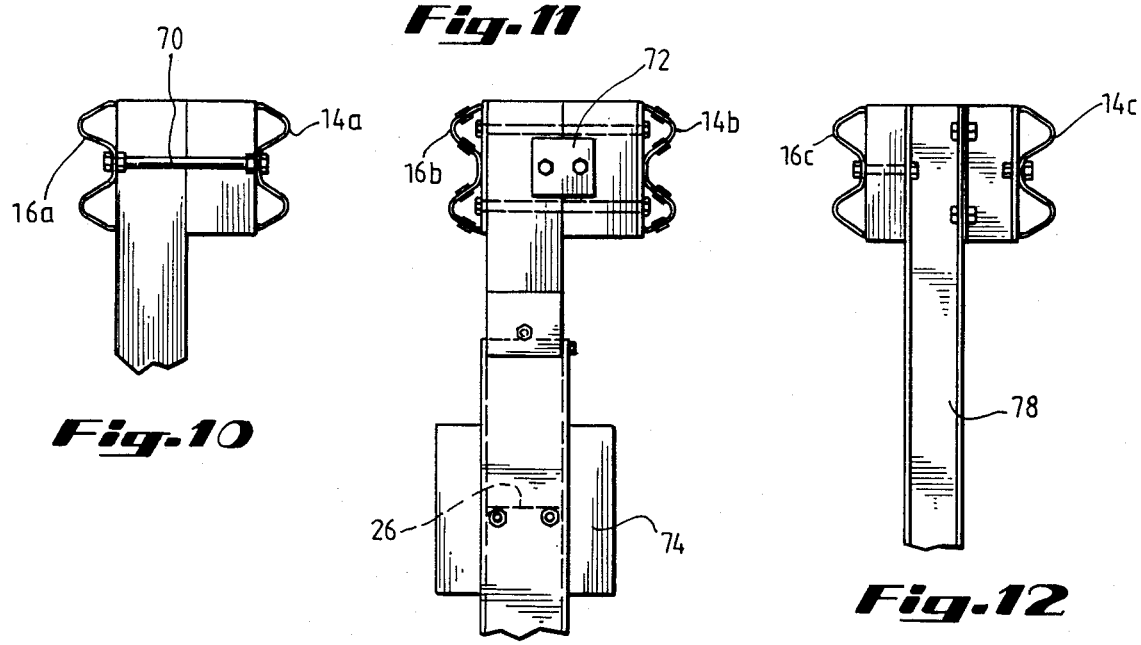
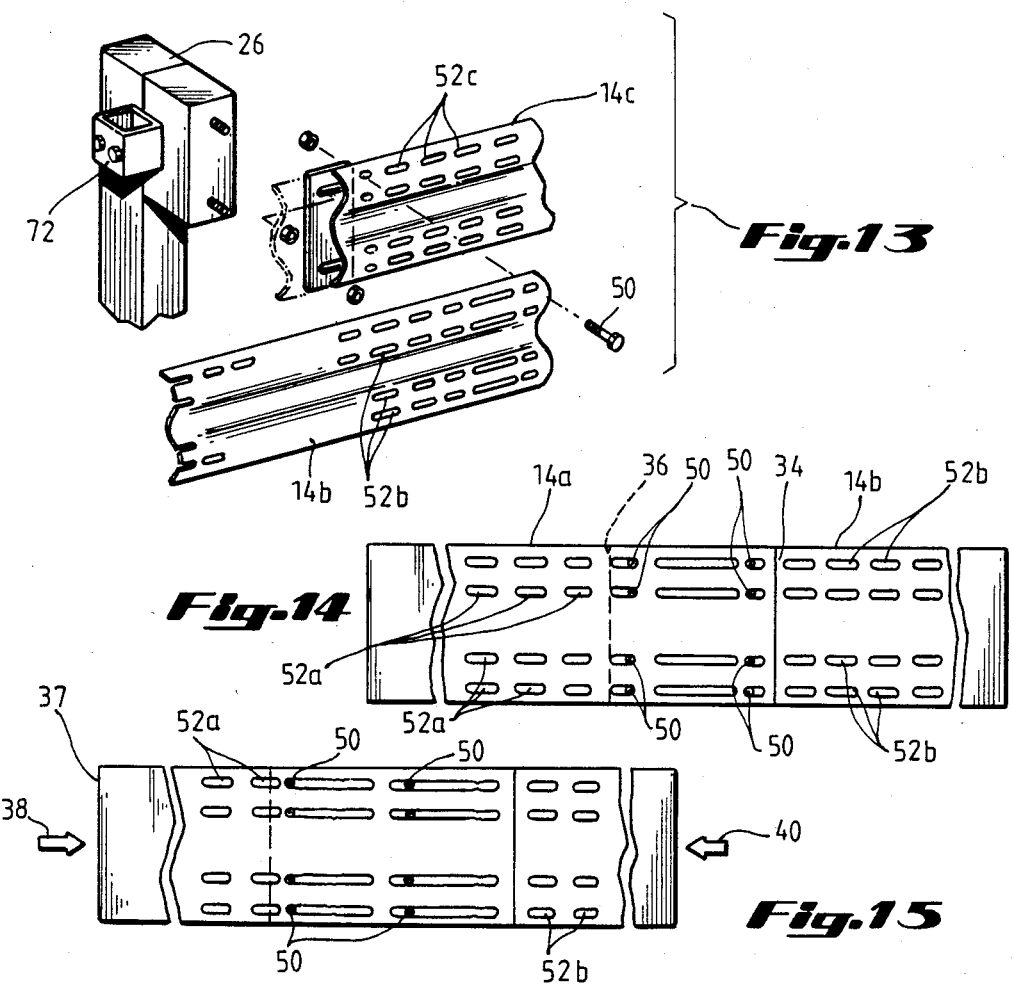

4,655,434

ENERGY ABSORBING GUARDRAIL TERMINAL

BACKGROUND OF THE INVENTION

The present invention was made as the result of work under a contract with the Federal Highway Administration of the United States of America, Contract No. DTFH61-81 C 00076.

Guardrails are traffic barriers placed along the roadside to screen errant vehicles from hazards behind the barrier. The most common guardrail in the U.S. is constructed using the standard steel W-beam mounted on spaced wood or steel posts. Because the W-beam functions primarily in tension when redirecting impacting vehicles, a function of the end is to provide necessary anchorage for the beam to develop necessary tensile forces. In addition, since the guardrail end represents a discontinuity in the barrier system, it is subject to being struck "head-on" by vehicles with small departure angales from the roadway. These head-on impacts have proved to be troublesome with W-beam barriers because of the significant spearing strength of the beam element. Some widely used terminal designs "bury" the W-beam at the end to eliminate spearing, but this design has been shown to cause vaulting and rollover due to the vehicle riding up the end, and subsequently becoming airborne.

Highway agencies have been using crash cushion devices at high accident locations for a number of years. These devices, costing from $5,000 to $20,000, absorb the energy of head-on impacts with decelerations that are not life-threatening for design conditions. Because the number of guardrail terminals is quite large, and the impact probability low for most, the states do not have the resources to employ crash cushion devices at most guardrail ends.

Development of terminal designs is complicated by the need to minimize end-on resistance for the small car impacts while still providing the necessary strength for full-size car impacts either on the end or downstream of the approach end.

The present invention is directed to an energy absorbing guardrail terminal which functions essentially as a crash cushion by providing a series of spaced openings which are in line with the spliced bolts when two beams are overlapped. This provides an energy absorbing mechanism as the rails are telescoped relative to each other by the spliced bolts shredding out the metal strips between the openings. The shredding of the material provides a uniform and controlled energy absorption mechanism. In addition, the sections of the guardrails are staged so that the upstream section will telescope first so as to minimize end-on resistance for the small car impacts while still providing the strength necessary to absorb full-size car impacts.

SUMMARY

The present invention is directed to an energy absorbing guardrail terminal for attachment to the upstream end of a conventional guardrail and includes a plurality of horizontally extending guardrails having overlapping ends, a plurality of vertical breakaway posts supporting the guardrails, and mounting bolts securing the rails to the posts. Splice bolts are connected between the overlapping ends of adjacent rails and a plurality of spaced openings are provided in each rail horizontally aligned with each of the spliced bolts whereby the impact of a vehicle on the upstream end of the rails will shred out the rail material between the spaced openings to absorb the kinetic energy of the impacting vehicle.

A still further object is wherein at least some of the openings are slots elongated in the horizontal direction.

Yet a still further object of the present invention includes means for allowing the first upstream rail to horizontally telescope over the next second adjacent rail and thereafter allow the second rail to telescope over a third rail.

Yet a still further object of the present invention is wherein the first upstream rail will horizontally telescope prior to the telescoping of the second adjacent rail by providing the first upstream rail of a lesser gauge thickness metal than the gauge of the second rail.

A still further object is wherein each rail overlaps the next adjacent downstream rail and each rail is bolted to a post at the upstream end of the rail and the splice bolts only interconnect the overlapping ends of the rail.

Yet a still further object is wherein the spaced openings extend substantially the length of the rails.

A still further object of the present invention is the provision of a plurality of horizontally extending rails on opposite sides of the post in which the rails on opposite sides of the post are parallel to each other. Preferably, spacing rods are provided between the parallel rails for maintaining the rails in a parallel relationship, and a rod bumper is positioned on the upstream side of a post and downstream of a spacing rod for bending and releasing the spacing rods when the sections telescope.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIG. 4 is a top plan view of the energy absorbing rail terminal of the present invention, FIG. 5 is an elevational view of the structure of FIG. 4, FIG. 6 is an enlarged perspective view of the upstream end of the guardrail terminal of the present invention, FIG. 7 is a perspective view of the second post from the upstream end of the terminal, FIG. 8 is a cross-sectional view taken along the line 8—8 of FIG. 5, FIG. 9 is a cross-sectional view taken along the line 9—9 of FIG. 5, FIG. 10 is a cross-sectional view taken along the line 10—10 of FIG. 5, FIG. 11 is a cross-sectional view taken along the line 11—11 of FIG. 5, FIG. 12 is a cross-sectional view taken along the line 12—12 of FIG. 5, FIG. 13 is an exploded perspective view illustrating the overlapping and splicing of two interconnecting ends of two rails, FIG. 14 is an elevational view of the interconnecting of two ends of adjacent rails with spliced bolts in their installed position, and FIG. 15 is an elevational view illustrating the shredding of the material between the spaced openings in the rails to provide the energy absorption or cushion upon impact of the upstream end of the terminal.

DESCRIPTION OF THE PREFERRED EMBODIMENT

Figure 1:
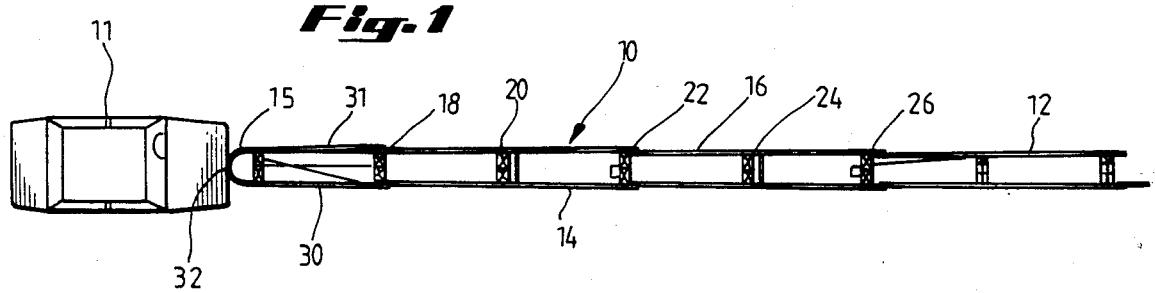
FIG. 1 is a schematic elevational view of the energy absorbing rail terminal of the present invention being impacted at its upstream or approach end.
Figure 2:
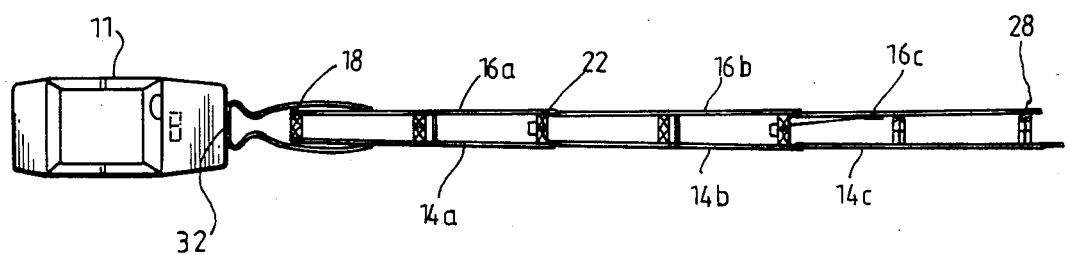
FIG. 2 is a view similar to FIG. 1 wherein the nose section of the terminal collapses on impact.

Referring now to the drawings, the reference numeral 10 generally represents the energy absorbing guardrail terminal of the present invention using a shredder concept. The terminal which is adapted to be connected to the upstream side of a conventional guardrail terminal 12 consisting of a first set 14 and a second local (i.e. extends only in terminal area) set 16 of horizontal extending guardrails having overlapping ends and supported from a plurality of vertical breakaway posts 15, 18, 20, 22, 24, and 26 and may be of any suitable number, here shown as six.

A nose section 30 is provided at the upstream end or approach end of the terminal 10. The first or nose section 30 may consist of a wrap-around end 31 connected to posts 15 and 18 as will be more fully described hereinafter.

Each set of rails 14 and 16 includes between posts 18 and 22 a first rail 14a and 16a, respectively, which overlap the ends of a succeeding rail 14b and 16b, respectively, which in turn overlaps a rail 14c and 16c, respectively, which is positioned between posts 26 and posts 28.

The purpose of the terminal 10 is to absorb energy upon impact of a vehicle 11 engaging the upstream end 32 of the terminal 10. Upon impact of the vehicle 11, depending upon the force of the impact, the first post 15 will break away and the nose section 30 will collapse. If the force of the impact is sufficient, the vehicle 11 will continue and will strike post 18 causing the rail members 14a and 16a to telescope over the members 14b and 16b, respectively, while breaking posts 18 and 20. If the momentum of the vehicle 11 is not fully absorbed by the telescoping energy absorbing action of rails 14a and 16a, the rails 14b and 16b will telescope over rails 14c and 16c, respectively, and the posts 22 and 24 will be broken.

The primary energy absorbing mechanism is caused by the shredding of metal strips between a series of openings or slots provided in the rails. Referring now to FIG. 14, the overlapping connection between rails 14a and 14b is best seen. Similar overlapping will occur between rails 14b and 14c, 16a and 16b, and 16b and 16c. As best seen in FIG. 14, the end 34 of rail 14a will overlap and be on the outside of the end 36 of rail 14b. The rails 14a and 14b may be of any suitable metal type rails such as flat rails, but preferably are conventional W-beam rails. Splice bolts 50, here shown as eight, splice the overlapping end of rail 14a to rail 14b. The splice bolts 50 interconnect only the rails and are not connected to the support posts. As will be more fully described hereinafter, the upstream end of rail 14b is secured to a vertical supporting post by one or more bolts, but the downstream end of rail 14a is not secured by bolts to a supporting post. A plurality of spaced openings 52a are horizontally aligned with each of the splice bolts 50.

Therefore, when a vehicle impacts the upstream end 37 of the rail 14a as indicated by the arrow 38 in FIG. 15 and with the rail 14b held stationary to a vertical post and therefore providing a reaction force as indicated by the arrow 40, the rail 14a will move downstream causing the splice bolts 50 to shred out the material between the spaced openings 52a. The shredding out of the metal rail material between the spaced openings 52a will absorb the kinetic energy of the impacting vehicle. Therefore, the splice bolts 50 will alternately move through the aligned slots 52a and alternately shred the material positioned between adjacent horizontally positioned slots 52a. The present structure provides a repeatability and control of the energy absorbed by the horizontal pitch or spacing of the horizontally aligned slots 52a. It is desirable that the slots 52a extend substantially continuously along the length of the rail 14a, but must be discontinued before the upstream beam edge encounters the splice bolt heads during collapse which would cause snagging and interrupt the smooth energy absorbing mechanism.

It is important that the first energy absorbing section consisting of rails 14a and 16a telescope downstream while the second energy absorbing section consisting of rails 14b and 16b remain stationary and that the rails 14b and 16b only telescope over the rails 14c and 16c, respectively, after telescoping of the rails 14a and 16a. Similarly, rails 14b and 16b will then be free to telescope over the standard guardrail section 12 consisting of rails 14c and 16c. Any suitable means may be provided to insure the staging of the collapse of the energy absorbing terminal 10. Preferably, the upstream rails may be made of a smaller gauge metal than the downstream rails. For example only, the rails 14a and 16a may be of a 12 gauge metal and the rails 14b and 16b may be of a ten gauge metal. For example only, the slots 52a may be ⅜ inches wide by 3 3/12 inches long and spaced 5/16 of an inch apart for use with a ⅝ inch splice bolt.

Figure 3:
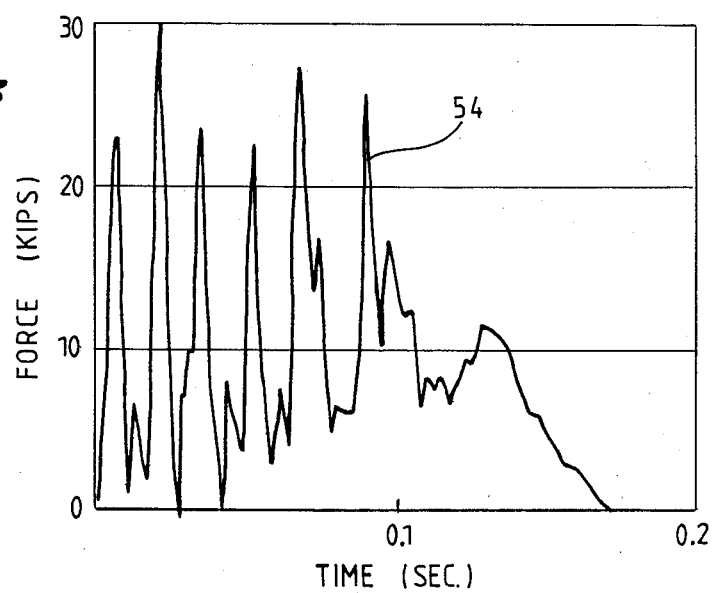
FIG. 3 is a graph illustrating the controlled energy absorbing characteristic of the present invention from a laboratory test of a short beam section.

Referring now to FIG. 3, a graph 54 is best seen illustrating a prototype experiment of the forces or absorbed energy measured when a series of slots 52a were shredded along a splice bolt line. The graph 54 illustrates the repeatability and control that can be obtained with the energy absorption system of the present invention.

Referring now to FIGS. 4, 5 and 6, the end post 15 is preferably wood mounted in a metal tube 55 having a soil plate 56 for insuring breakage of the breakaway pole 15 upon impact and for developing cable anchorage forces during downstream impacts. In order to allow the terminal 10 to withstand angular vehicle impacts downstream of the end 32, a cable 56 is provided between the posts 15 and a fitting 58 on the wrap-around end plate 31. In addition, a strut 60 is provided for additional support for the anchor cable forces.

Referring to FIGS. 7 and 8, the second post 18 supports the upstream ends of the rails 14a and 16a by bolt 64 and is also connected to a metal tube 66 with a soil plate 68. The wrap-around end 31 is spliced to the rails 14a and 16a at conventional spliced holes.

FIG. 9 illustrates wood posts 20 supporting rails 14a and 16a intermediate their ends in a lateral direction, but without any bolting of the rails 14a and 16a to the post 20. Therefore, the rails 14a and 16a are free for telescoping movement without any restraint to the post 20. The connection of the rails 14b and 16b to post 24 is similar to that shown in FIG. 9.

Referring now to FIGS. 4 and 10, a spacing rod 70 is illustrated positioned between the rails 14a and 16a for maintaining the rails 14a and 16a in a parallel relationship by providing nuts on each side of the rails 14a and 16a connected to the rod 70. This assist in keeping the rails 14a and 16a parallel as they are telescoped downstream.

Referring now to FIGS. 4, 5 and 11, it is to be noted that a box beam 72 or other construction is mounted downstream of end spacing rod 70 on the posts 22 and 26 for bending and releasing the rods 70 as the rails 14a and 16a and 14b and 16b telescope downstream. It is also noted that the end of the second stage section consisting of rails 14b and 16b is anchored by a cable 74 between the base of the post 26 which also includes a metal-to-bottom and soil plate 74 for providing downstream support in the event of an impact for absorbing tension forces in the terminal 10.

Referring now to FIG. 12, a portion of a standard guardrail 12 is shown having an I-beam steel post 78 supporting rails 14c and 16c by rigid connections to the steel post 78.

FIG. 13 is a perspective exploded view of the connection to post 26 showing the overlap of rails 14b and 14c.

The present invention, therefore, is well adapted to carry out the objects and obtain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. An energy absorbing guardrail terminal comprising,
   a plurality of horizontally extending guardrails having overlapping ends,
   a plurality of vertical breakaway posts supporting said guardrails,
   mounting bolts securing the underlapped rails to the posts,
   splice bolts connecting the overlapping ends of adjacent rails, and
   a plurality of spaced openings in each rail longitudinally aligned with each of the splice bolts whereby the impact of a vehicle on the upstream end of the rails will shred out the rail material between the spaced openings to absorb the kinetic energy of the impacting vehicle,
   means for allowing the first upstream rail to horizontally telescope over the next second adjacent rail, and thereafter the second rail to telescope over the third rail, said first upstream rail is of a lesser gauge thickness than the second rail.

2. An energy absorbing guardrail terminal comprising,
   a plurality of horizontally extending guardrails having overlapping ends,
   a plurality of vertical breakaway posts supporting said guardrails,
   mounting bolts securing the underlapped rails to the posts,
   splice bolts connecting the overlapping ends of adjacent rails, and
   a plurality of spaced openings in each rail longitudinally aligned with each of the splice bolts whereby the impact of a vehicle on the upstream end of the rails will shred out the rail material between the spaced openings to absorb the kinetic energy of the impacting vehicle, and
   a plurality of horizontally extending rails on opposite sides of the posts, said rails on opposite sides of the posts being parallel to each other.

3. The apparatus of claim 2 including,
   spacing rods between the parallel rails for maintaining the rails in a parallel relationship.

4. The apparatus of claim 3 including,
   a rod bumper positioned on the upstream side of a post and downstream of a spacing rod.

5. An energy absorbing rail terminal comprising,
   first and second sets of a plurality of horizontally extending guardrails having overlapping ends,
   a plurality of vertically positioned breakaway posts positioned between and supporting the first and second sets of guardrails,
   mounting bolts securing the upstream ends only of the rails to the posts,
   splice bolts connecting the overlapping ends of adjacent rails,
   a plurality of spaced openings in each rail horizontally aligned with each of the splice bolts whereby the impact of a vehicle on the upstream end of the rails will shred out the rail material between the spaced openings to absorb the kinetic energy of the impacting vehicle, at least some of the openings being elongated in the horizontal direction,
   means for allowing the upstream rail to horizontally telescope over the next adjacent second rail, and thereafter the second rail to telescope over the next adjacent third rail.

6. The apparatus of claim 5 wherein the upstream rail of a lesser gauge thickness than the second rail.

7. An energy absorbing guardrail terminal comprising,
   a plurality of horizontally extending guardrails having overlapping ends,
   a plurality of vertical breakaway posts supporting said guardrails,
   mounting bolts securing the upstream end of the rails to the posts,
   splice bolts connecting the overlapping ends of adjacent rails,
   a plurality of spaced horizontally extending elongated openings in each rail longitudinally aligned with each of the splice bolts and extending substantially continuously along the length of each rail, the length of the elongated spaced openings being longer than the distance between the adjacent openings whereby the impact of a vehicle on the upstream end of the rails will move the splice bolts through the aligned openings and alternately shred the rail material positioned between adjacent horizontally positioned openings to absorb the kinetic energy of the impacting vehicle.

* * * * *